Feb. 2, 1965 R. B. WEAVER 3,167,910
THRUST TERMINATION DEVICE AND METHOD
Filed Jan. 25, 1963 3 Sheets-Sheet 1
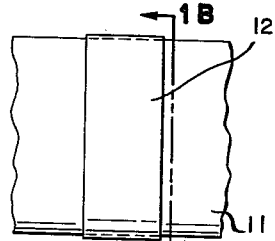
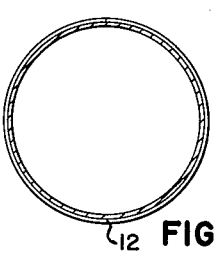
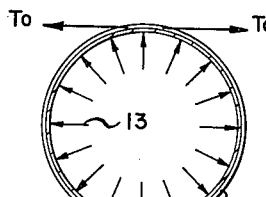
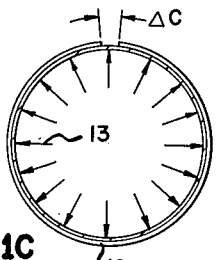
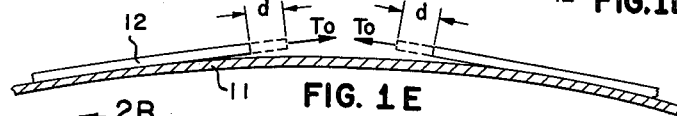
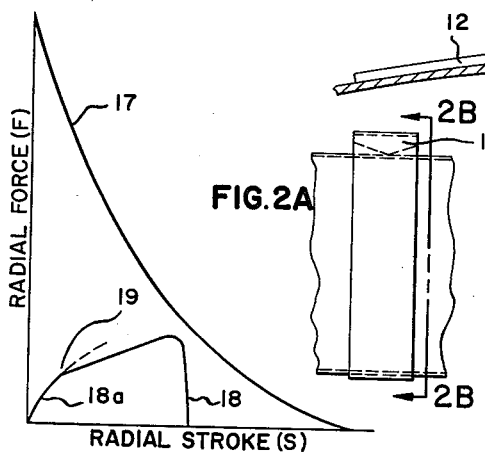
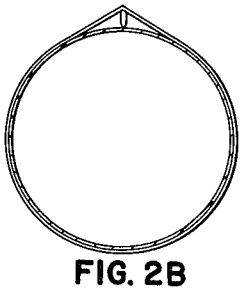
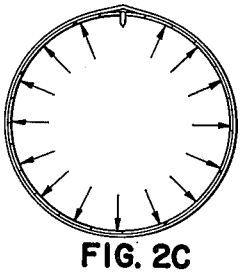
INVENTOR.
ROBERT B. WEAVER
BY
*Flehr and Swain*
ATTORNEYS

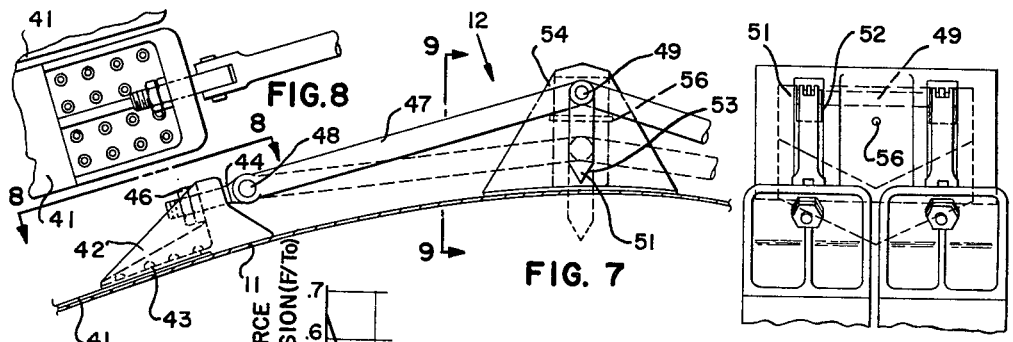
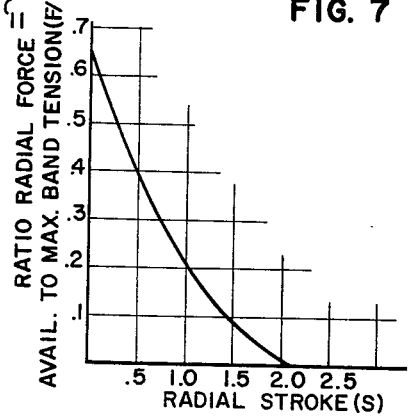
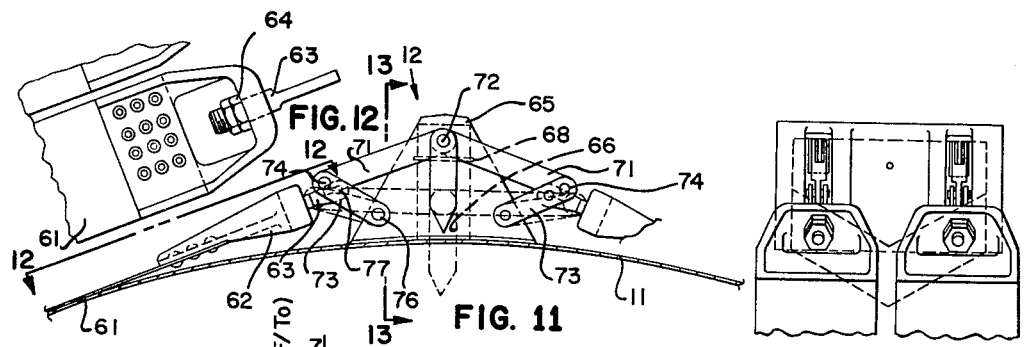
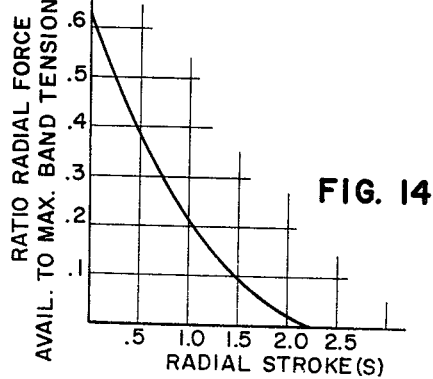

United States Patent Office 3,167,910
Patented Feb. 2, 1965

3,167,910
THRUST TERMINATION DEVICE AND METHOD
Robert B. Weaver, Palo Alto, Calif., assignor to Weaver Associates, Palo Alto, Calif., a partnership
Filed Jan. 25, 1963, Ser. No. 253,910
15 Claims. (Cl. 60—35.6)

This invention relates to a thrust termination device and method and more particularly to a thrust termination device and method for use with solid propellant rocket motors.

In the utilization of solid propellant rocket motors, there is the possibility of accidental ignition during transportation, handling and storage, or while in launch position during preparation of a missile for flight. Fire, sparks, hot fragments, lightning and inadvertent actuation of the ignitor are among the possible causes. Once ignited, the propellant will burn to exhaustion because there is no known way of extinguishing the flame. Unless the thrust forces are counteracted in some manner or the motor destroyed, an accidentally ignited rocket can cause damage and injury at great distance from the point of the accident. If free flight should be obtained, populated areas could easily be jeopardized. In the past, it has been a common practice to render solid propellant motors nonpropulsive by the use of exhaust deflectors, blowout discs and other means of thrust neutralization, but such devices impose a penalty on the performance of the motors. Various means have also been devised to destroy accidentally ignited motors. In most instances, such means have employed stored energy in some form and have created new risks of inadvertent actuation of the safety device itself. There is, therefore, a need for a device and method which can be utilized for eliminating propulsive hazards associated with the accidental ignition of solid propellant rocket motors.

In general, it is the object of the present invention to provide a thrust termination device and method in which propulsive hazards associated with the accidental ignition of solid propellant rocket motors are eliminated.

Another object of the invention is to provide a device and method of the above character in which additional stored energy is not required.

Another object of the invention is to provide a device and method of the above character which can be utilized on solid propellant rocket motors as now designed.

Another object of the invention is to provide a device and method of the above character in which forces created by ignition of the solid propellant rocket motor are utilized for destroying the rocket motor.

Another object of the invention is to provide a device of the above character which can operate automatically in the event of ignition of the solid propellant rocket motor.

Another object of the invention is to provide a device of the above character which is incapable of functioning without actual ignition of the solid propellent rocket motor.

Another object of the invention is to provide a device of the above character which can be readily mounted on and removed from solid propellant rocket motors.

Another object of the invention is to provide a device of the above character which is relatively inexpensive.

Another object of the invention is to provide a device of the above character which can be used during transportation of the rocket motor.

Additional objects and features of the invention will appear from the following description in which the preferred embodiments are set forth in conjunction with the accompanying drawings.

Referring to the drawings:

FIGURE 1A is a schematic illustration of a portion of a cylindrical pressure vessel with a cylindrical band for retarding normal expansion of the pressure vessel.

FIGURE 1B is a cross-sectional view taken along the line 1B—1B of FIGURE 1A.

FIGURE 1C shows the cylindrical pressure vessel which is assumed to be pressurized with the ends of the band held in contact with the hoop or band tensioning force being designated as $T_0$.

FIGURE 1D is a view similar to FIGURE 1C in which the ends of the band have been assumed to have parted sufficiently to remove all tension in the band and constriction effects upon the cylindrical pressure vessel.

FIGURE 1E illustrates how the ends of a circumferential constriction band provide a source of force and energy for use in my device and method.

FIGURE 2A is a side elevational view showing a very simplified version of my device.

FIGURE 2B is a cross sectional view taken along the line 2B—2B of FIGURE 2A.

FIGURE 2C is a view showing the operation of my device upon expansion of the pressure vessel.

FIGURE 2D is a graph showing the force available envelope for the device shown in FIGURES 2A and 2B.

FIGURE 3A is a cross sectional view showing another embodiment of my device using steps in the constriction band.

FIGURE 3B is a graph showing the force available envelope for the device shown in FIGURE 3A.

FIGURE 4 is a cross sectional view of another embodiment of my device with certain parts broken away in which the cutter is supported by a shear pin in a housing.

FIGURE 5 is a partial top plan view looking along the line 5—5 of FIGURE 4.

FIGURE 6 is a graph showing the force available envelope for the embodiment shown in FIGURES 4 and 5.

FIGURE 7 is a partial view showing still another embodiment of my device.

FIGURE 8 is a cross sectional view taken along the line 8—8 of FIGURE 7.

FIGURE 9 is a view looking along the line 9—9 of FIGURE 7.

FIGURE 10 is a graph showing the force available envelope for the device shown in FIGURES 7, 8 and 9.

FIGURE 11 is a partial view of still another embodiment of my device incorporating my invention.

FIGURE 12 is a view looking along the line 12—12 of FIGURE 11.

FIGURE 13 is a view looking along the line 13—13 of FIGURE 11.

FIGURE 14 is a graph showing the envelope of force available for the device shown in FIGURES 11, 12 and 13.

Figure 15:
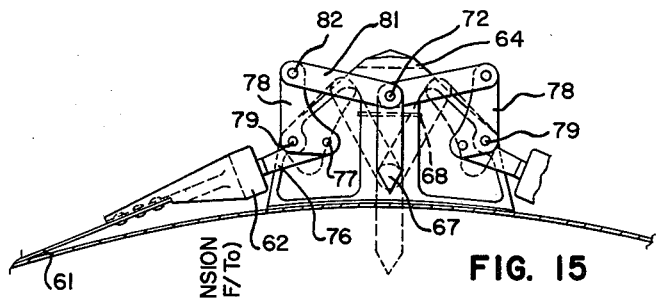
FIGURE 15 is a view of still another embodiment of my invention.

In general, my device for terminating the thrust on an accidentally ignited solid propellant rocket motor of the type having a casing consists of means encompassing the casing to retard expansion of the casing during pressure build-up within the casing caused by burning of the solid propellant within the casing. It also consists of means actuated by the encompassing means as the encompassing means is expanded to rupture the casing to thereby destroy the rocket motor.

Reference may now be had to FIGURES 1A, B, C, D and E to understand the principles of my thrust termination device and method. It is well known that with rocket motors, a high internal pressure must be created in the combustion chamber for thrust to be delivered. The chamber is, therefore, a pressure vessel requiring adequate structure to withstand the internal pressure as well as other loads to which the rocket motor is subjected. The structure of the solid propellant motor consists of an external casing 11 of any desired configuration, usually cylindrical, with end closures (not shown), of which one includes the nozzle or nozzles of the rocket motor. The radius-to-wall-thickness ratios of the casings vary considerably depending upon the materials used and the level of internal pressure during combustion, but it is normal to design the wall thickness to the minimum required to increase the capability of the rocket motor. Various metals and composites such as fiberglass reinforced plastic are commonly employed materials for rocket motor casings.

A solid propellant (not shown) is normally disposed within the casing 11. Upon ignition of the solid propellant, an internal pressure is developed within the chamber formed by the casing. With the development of this internal pressure, the casing for the rocket motor expands. The extent of the expansion depends on the stresses and elastic properties of the casing. Normally, a pressure vessel expands in a direct proportion to the pressure during pressure build-up and the work of expansion equals the strain energy stored in the vessel walls. In FIGURE 1A, means in the form of a band 12 is provided for encompassing or encircling the casing 11 to retard expansion of the casing. As hereinafter explained, such a circumferential band can be utilized for obtaining energy for external use, namely for use in my thrust termination device. In FIGURES 1A and 1B, the external band 12 is wrapped around an unpressurized cylindrical casing 11 so that its ends are in contact with no slack or stress in the band. In FIGURE 1C, the cylindrical casing is assumed to be pressurized uniformly in all directions as indicated by the arrows 13 with the ends of the band held in contact. In this condition, the band has prevented the expansion of a localized circumferential external area of the casing 11 which has caused the creation of stresses within the hoop or band 12 which oppose the radial pressure forces represented by the arrows 13. The band 12 must, therefore, assist the reaction of the radial pressure forces by providing a hoop tension force, designated as $T_0$ in FIGURE 1C. Since the band 12 is elongated under its own hoop tension, partial expansion of the casing underlying the band or hoop is permitted. Therefore, the band and the localized portion of the casing share the reaction of internal pressure in proportion dictated by the relative dimensions and elastic properties. Within limits, a desired value of $T_0$ can be provided by appropriate selection of width, thickness and material for the band.

In FIGURE 1D, the ends of the band 12 are assumed to have been parted sufficiently to remove all tension in the band and all constriction effects on the casing 11. In passing from the condition shown in FIGURE 1C to that shown in 1D, the band has contracted from its elongated state concurrently with further local expansion of the casing such that the ends are parted by a distance equal to the circumferential elongation of the unconstricted casing, in other words, by the difference $\Delta_C$ (difference between the circumferences of the pressurized and unpressurized casing). It can be shown analytically that the tension in the band decreases linearly in passing from the condition shown in FIGURE 1C to the condition shown in 1D such that the average tension throughout the displacement is $T_0/2$ where $T_0$ is the maximum tension at the condition shown in FIGURE 1C. The energy available for the action of the band is, therefore, $T_0\Delta_C/2$.

FIGURE 1E illustrates further how the ends of a constriction band 12 can be used to provide a source of force and energy. In the illustration shown in FIGURE 1E, a short length of arc is provided for whatever device is to be employed to receive force and energy inputs from the band. The initial position of the ends of the band 12 with the cylinder unpressurized is shown by the dashed lines. To hold the ends in this position with the casing 11 pressurized requires tension forces $T_0$. The position of the ends of the band 12 after removal of tension is shown by solid lines. If the length of arc between ends is a small fraction of the circumference, the displacement at each end is approximately $\Delta_C/2$.

From the foregoing description, it can be seen that the force and energy available are governed by the magnitude of $T_0$, and hence by the properties of the constriction band. However, the actual displacement is governed by the pressure growth of the casing and is independent of the material and dimensions of the band. If it were desirable to do so, some increase could be given to both $T_0$ and the displacement for a given band and casing by providing a tension preload in the band reacted by hoop compression in the cylinder in the unpressurized condition.

In my thrust termination device and method to be utilized for the destruction of accidentally ignited rocket motors, I utilize force and energy obtained in the manner described above. As shown in FIGURE 2, I utilize this force and energy to cause movement of a tool 16 so that a sufficient damage is inflicted to the casing to initiate total failure of the rocket motor by a propagated rupture of the rocket casing. For example, this would occur if the tool places a cut in the casing which induces rupture if the cut is of sufficient length for stress concentrations at the ends of the cut to equal the ultimate strength of the material of which the casing is formed. A pressurized cylinder is under both hoop tension to react radial pressure forces and longitudinal tension to react pressure acting on the end closures. If the material is homogeneous, the hoop stress is twice longitudinal stress, in which case a longitudinal cut is more proficient than a lateral one in causing rupture of the casing. With composites such as filament wound motor casing, a lateral cut is sometimes more proficient. In either case, a specific or "critical" length of cut would be required for rupture depending on the material properties of the particular rocket motor casing and the stress magnitudes developed by internal pressure.

The function of my thrust termination device is to create a cut equal to or greater than the critical length during pressure build-up following ignition of the rocket motor. In order to produce a satisfactory cut, it is necessary that the tool travel or have a stroke which overcomes local deflection of the casing and which will also puncture and penetrate the casing. The forces required to actuate the tool in this manner are governed by many factors, both in magnitude and in variation with the stroke. The basic requirement for satisfactory performance is that the forces required throughout the action of the tool be within the envelope of force available to it from the constriction band which I utilize in my thrust termination device.

The tool 16 in FIGURE 2 is a wedge shaped cutter which is directed radially at the rocket motor with the constriction band 12 surrounding the casing 11 and passing over the cutter such that radial forces are applied to the cutter as components of the tension in the band. The positions of the cutter before and after pressurization are shown in FIGURES 2B and 2C. A comparison of the assumed force required by the cutter or cutting tool to the envelope of force available from the band 12 is shown graphically in FIGURE 2D. The envelope formed by the line 17 represents a maximum radial force that can be applied to the cutter 16 at all positions in its stroke by full internal pressure in the casing 11.

In FIGURE 2D, the curve 18 shows the force required for operating the tool 16. The initial part of the curve designated as 18a represents the force required for deflection of the casing before puncture at point 19 by the tool 16, and the upwardly inclined intermediate portion represents the additional force required as pressure builds up to cause the tool to penetrate the cylinder sufficiently to induce rupture of the casing before full pressure is developed within the casing. With the length of cut inflicted in the casing being equal to or greater than the critical length at full pressure, the casing will rupture longitudinally by propagation.

Because of the high peak force available at zero stroke of the embodiment shown in FIGURE 2A and the inherent limitation of the stroke available, the efficiency of the thrust termination device is relatively low where efficiency is the ratio of energy utilized to the energy available. The energy utilized is represented by the area within the line 18, whereas the energy available from the constriction band is represented by the area within the force available envelope 17. It is possible to improve the efficiency of the device by altering the shape of the cutting tool 16 to obtain a force required curve which is more compatible in shape with the force available curve 17. However, I have found it more desirable to alter the shape of the force available curve by mechanical means. If losses due to friction or other effects are neglected, the area within the force available envelope, regardless of its shape, is constant for a given constriction band because the energy available is a fixed quantity.

In FIGURE 3A, I have illustrated relatively simple means for altering the force available envelope and effecting an increase in available stroke. This means consists of a pair of raised steps 21 which are provided between the casing wall and the band and spaced on opposite sides of the cutting tool 16 as shown particularly in FIGURE 3A. The effect of these steps is to reduce the initial peak force. The force available envelope without the steps 21 is shown by the dashed line 22, whereas the force available envelope with the steps 21 is shown by the solid line 23. The result shown graphically in FIGURE 3B is an increase in stroke since the area within the force available envelope remains the same.

In general, the relatively simple versions of my thrust termination device shown in FIGURES 2 and 3 have force available envelopes characterized by high peaks of force available at zero stroke, rapid decay of force with stroke, and a force of low magnitude at the later stages of the travel of the tool or cutter. For many applications, such characteristics would not preclude satisfactory performance. However, for others, it is desirable and may be necessary to eliminate the high peak at zero stroke and to provide higher forces at the later stages of travel of the tool cutter. This can be accomplished by employing mechanical means of controlling the mechanical advantage between the cutting tool and the constriction band as hereinafter described.

In the embodiments shown in FIGURES 2 and 3, no means is provided for preventing contact of the cutting tool with the casing of the rocket motor prior to ignition. The tool will apply a force to the casing of the rocket motor as soon as the pressure starts to build up. Throughout the action of the cutting tool, tension of the band never exceeds that acting in balance of the forces required by the cutting tool during its penetration. Low efficiency results from the constriction band's failure to obtain the magnitude of energy from pressure growth for which it is capable.

Generally, it is desirable to prevent contact of the cutting tool with the casing prior to ignition of the rocket motor, and, therefore, it is desirable to provide means for holding the cutting tool out of engagement with the casing and to release it only after actual ignition of the rocket motor has taken place.

In FIGURES 4 and 5, I have provided a thrust termination device which incorporates such features. This thrust termination device consists of a band 12 formed by an upper strap assembly 26 and a lower strap assembly 27. The upper strap assembly includes a strap 28 and the lower strap assembly 27 includes a strap 29. The ends of the straps 28 and 29 are provided with fittings 31 disposed on opposite sides of the casing 11. The fittings are interconnected by suitable means such as bolts 32 which extend through the fittings as shown particularly in FIGURE 4. These fittings with the bolts provide means for mounting and removing the thrust termination device and also make it possible to adjust the band by tightening or loosening the bolts 32 so that the band properly grips the casing 11 of the rocket motor.

The upper assembly 26 also includes a fixture or housing 34 which is provided with an arcuate lower supporting surface that is adapted to engage the outer surface of the casing 11 as shown particularly in FIGURE 4. This large surface area bearing upon the casing 11 is provided so that the housing can support substantial forces without buckling or denting the casing 11. This housing is provided wiht a radially extending elongate slot 36 opening downwardly through the arcuate wall of the housing. The open slot thus faces the casing and also extends longitudinally of the casing. A shear pin 38 is mounted in the fixture 34 and extends through the cutting tool 16. It will be noted that the shear pin and the cutting tool 16 are positioned so that the cutting tool is normally retained out of engagement with the casing 11 as shown particularly in FIGURE 4. The band 28 passes around the fixture or housing 34 and over the top of the tool 16 as shown particularly in FIGURE 4.

During transportation and normal storage of the rocket motor, the band 12 is tensioned so that it snugly fits on the casing 11 of the rocket motor. In the event of accidental ignition of the rocket motor, pressurization develops as hereinbefore described to expand the casing. The pressure build-up in the casing places additional stress upon the band 12 and the pressure build-up continues until the band 12 places sufficient force on the shear pin 38 to cause it to fail to permit the cutting tool 16 to be moved rapidly downwardly so that the cutting tool 16 strikes the casing 11 with a substantial impact to assist the initial penetration of the casing 11 by the tool. Depending upon the amount of impact desired, the force required for release of the cutting tool by failure of the shear pin can be chosen by choosing the proper size of the shear pin. Thus, with appropriate clearance between the casing and tool, the strain energy stored in the band results in the tool achieving an appreciable impact velocity at the instant of contact. Penetration of the tool continues to the dotted line position shown in FIGURE 4. The size of the tool is chosen so that the length of the cut within the casing 11 is greater than the critical length at full pressure so that the casing 11 ruptures longitudinally by propagation.

The force available envelope for the thrust termination device of FIGURES 4 and 5 is shown in FIGURE 6. It is again characterized by having a force which is maximum at the initial position and which decays rapidly with the stroke.

In FIGURES 7, 8 and 9, there is shown another embodiment of my thrust termination device which utilizes the stepped principle disclosed in FIGURE 3. This thrust termination device consists of a band 12 formed by a pair of straps 41 which encompass or encircle the rocket motor casing 11 as shown in FIGURE 7. Fittings 42 are secured to the ends of the straps by suitable means such as rivets 43. An eye bolt 44 extends through each of the fittings 42 and is secured thereto by suitable means such as nuts 46. Connecting rods 47 are pivotally connected to the eye bolts by pins 48. The other ends of the connecting rods 47 are pivotally connected to a pin 49 which extends through the upper end of a cutting tool 51. The upper end of the cutting tool is provided with cut-outs 52 for receiving the ends of the connecting rods 47. The cutting tool 51 is mounted for radial movement in a slot 53 provided in a housing 54. The housing 54 is provided with a downwardly facing arcuate surface which is adapted to rest upon the casing 11. The cutting tool 51 is normally retained in a position out of engagement with the casing by a sheer pin 56 provided in the housing 54 and which extends through the cutting tool 51.

Operation of this embodiment of my thrust termination device is very similar to that hereinbefore described. The force available envelope is shown in FIGURE 10. The device can be readily mounted and removed from a rocket motor by removing the nuts 46 from the eye bolts 44. The steps in the embodiment shown in FIGURE 7 are provided by the fittings 42. The primary advantage of the embodiment shown in FIGURES 7 and 8 over the embodiment shown in FIGURES 4 and 5 is that it is possible to provide an increase in radial stroke over that possible in the embodiment shown in FIGURES 4 and 5. In other respects, the two devices differ little in performance characteristics.

Still another embodiment of my invention is shown in FIGURES 11, 12 and 13. This embodiment is very similar to that shown in FIGURES 7 and 8 with the exception that the steps are obtained by the use of the linkage arrangement illustrated. This embodiment consists of a band 12 formed by straps 61 within fittings 62 connected to their ends. Eye bolts 63 extend into the fittings and are secured thereto by nuts 64. A housing 65 is mounted upon the casing 11 and is provided with a vertically extending downwardly opening slot 66 which extends longitudinally of the casing and which receives a cutting tool 67. The cutting tool is normally retained in a position out of engagement with the casing by shear pin 68 mounted in the housing and extending through the cutting tool. Links 71 are pivotally connected to the upper end of the cutting tool by a pin 72 which extends through the links. The other ends of the links 71 are pivotally connected to other links 73 by pins 74. The other ends of the links 73 are pivotally mounted on fixed pins 76 mounted in the housing 65. The links 73 are also pivotally connected by pins 77 to the eye bolts 63. The primary advantage of the embodiment shown in FIGURES 11, 12 and 13 is that by the appropriate selection of the hinge point for the links 73 and pin locations, a longer stroke can be obtained for the cutting tool than in the embodiments hereinbefore described.

The force available envelope is shown in FIGURE 14 and is similar to that for the embodiments shown in FIGURES 4 and 5, and in 7, 8 and 9 in that the force is at a maximum at the initial position and decays rapidly with the stroke.

Figure 16:
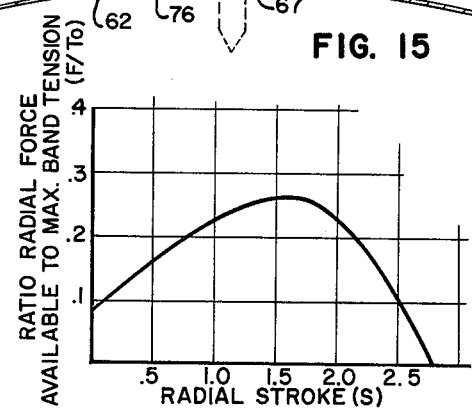
FIGURE 16 is a graph showing the envelope of force available for the device shown in FIGURE 15.

Still another embodiment of my invention is shown in FIGURE 15. It is very similar to that shown in FIGURES 11, 12 and 13 with the exception that a different type of linkage mechanism is utilized for connecting the fittings 62 to the cutting tool 67. Eye bolts 76 are secured to the fittings 62 and are pivotally connected by pins 77 to arms 78. The arms 78 are pivotally mounted on fixed pivot pins 79 mounted in the housing 64. Links 81 are pivotally connected to the upper ends of the arms by pins 82 and are also pivotally connected to the pin 72 which extends through the cutting tool 67. The particular linkage shown in FIGURE 15 provides a peak in the force available at an intermediate position of the cutting tool and forces of a greater magnitude than those available with the preceding embodiments of my thrust termination device hereinbefore described at the later stages of travel of the cutting tool. This is apparent by examining the force available envelope shown in FIGURE 16. By proper selection of hinge and pin locations, the force available envelope can be tailored to provide a shape compatible with the variation of force required by the cutting tool to make the penetration through the casing 11. In general, with such a linkage mechanism, it is possible to closely match the force available to the force required.

Figure 17:
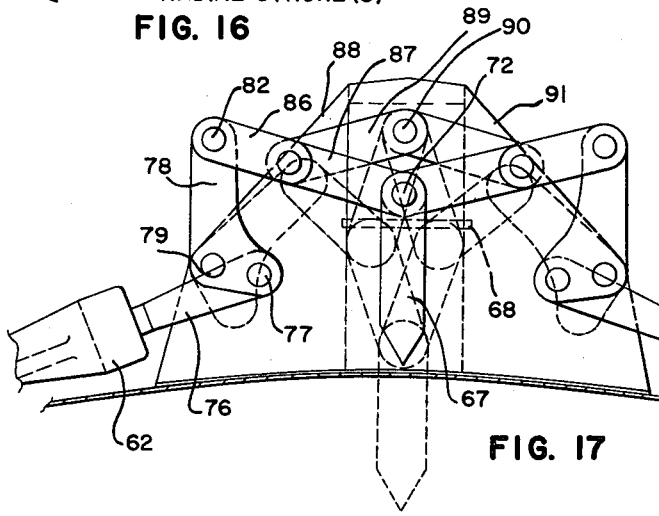
FIGURE 17 is a partial view of still another embodiment of a device incorporating my invention.
Figure 18:
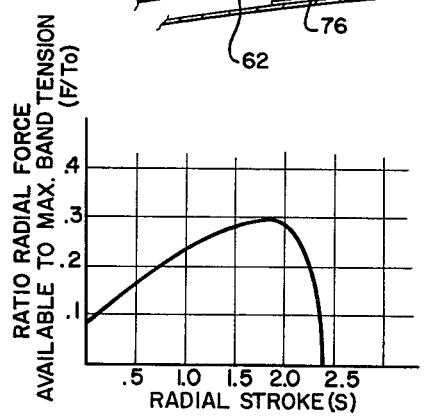
FIGURE 18 is a chart showing the envelope of force available.

Still another embodiment of my thrust termination device is shown in FIGURE 17 which shows the use of a still different linkage mechanism. In this linkage mechanism, the links 86 are pivotally connected to the upper end of the arms 78 by pins 82. The links 86 are also pivotally connected to the upper end of the cutting tool 67 by the pin 72. Additional links 89 are pivotally connected to links 86 and 87 by pins 88. Links 89 are also pivotally connected to fixed pivot pins 90 mounted in the housing 91. By the use of the additional links shown in FIGURE 17, the peak in the force available can be shifted closer to the maximum stroke position which, under some instances, makes possible a higher degree of efficiency. The shifting of the peak in the force available can be readily seen by viewing the force available envelope shown in FIGURE 18.

It is readily apparent from the foregoing that linkage systems other than those described can be utilized. For example, cams and other similar devices can be utilized to control the variation of force available to the cutter. Also, other types of cutting action can be utilized such as providing lateral or longitudinal motion to the cutting tool or rotation to operate in the manner of a beer can opener.

In the embodiments of my thrust termination device as shown, I have not disclosed special components which may be required for a specific type of rocket motors such as means for bridging external fairings or other protuberances. Such special connecting fittings in the circumferntial bands can be readily improvised by those skilled in the art and are normally determined by the particular design of the rocket motor.

It is also apparent from the foregoing that I have provided a thrust termination device which can be readily mounted on and removed from rocket motors. While mounted on the rocket motor, it provides safety means to prevent an accidentally ignited rocket from causing damage or injury beyond the confines of a local area. Since the device can be readily removed, it does not penalize the rocket motor during its normal use.

I claim:

1. In a device for terminating the thrust on an accidentally ignited solid-propellant rocket motor of the type having a casing, means encompassing the casing to retard expansion of the casing during pressure build-up within the casing caused by burning of the solid propellant within the casing and means actuated by the encompassing means as it is expanded to rupture the casing to thereby destroy the rocket motor.

2. In a device for terminating the thrust on an accidentally ignited solid propellant rocket motor of the type having a casing, means encompassing the casing to retard expansion of the casing during pressure build-up within the casing caused by burning of the solid propellant within the casing, a cutting tool, means actuated by the encompassing means as it is expanded to move the cutting tool into engagement with the casing to rupture the casing to thereby destroy the rocket motor.

3. A device as in claim 2 together with means for normally retaining the cutting tool out of engagement with the rocket casing.

4. A device as in claim 2 together with means for retaining the cutting tool out of engagement with the casing until a predetermined force is applied to the cutting tool.

5. In a device for terminating the thrust on an accidentally ignited solid propellant rocket motor of the type having a cylindrical casing, a band substantially encircling the casing, a housing mounted on the casing, a cutting tool mounted in the housing for movement toward and away from the casing, and means for applying forces from the band to the cutting tool, said band being arranged so that it retards expansion of the casing during pressure build-up within the casing caused by burning of the solid propellant within the casing, said band expanding as the casing expands to apply forces to cause the tool to rupture the casing to thereby destroy the rocket motor.

6. A device as in claim 5 together with means mounted in the housing for normally retaining the cutting tool out of engagement with the casing.

7. A device as in claim 5 together with means for retaining the cutting tool out of engagement with the casing until a predetermined force has been applied to the cutting tool.

8. A device as in claim 5 wherein the means for applying forces from the band to the cutting tool includes a linkage mechanism.

9. In a device for terminating the thrust on an accidentally ignited solid propellant rocket motor of the type having a casing, a housing mounted on the casing, a cutting tool mounted in the housing for movement toward and away from the casing, a band disposed about the casing, means connecting the ends of the band to the cutting tool, and means for adjusting the tension on the strap so that it snugly fits the casing of the rocket motor, said strap being positioned so that it retards expansion of the casing during pressure build-up within the casing caused by burning of the solid propellant within the casing, said strap expanding as the casing expands to apply forces to the tool to cause the tool to rupture the casing to thereby destroy the rocket motor.

10. A device as in claim 9 wherein said means for securing the ends of the band to the tool includes a linkage mechanism.

11. A device as in claim 10 wherein said linkage mechanism is spaced away from the casing.

12. A device as in claim 10 together with means mounted in the housing for retaining the cutting tool out of engagement with the casing until a predetermined force is applied to the cutting tool by the band.

13. A device as in claim 12 wherein the means for securing the ends of the band to the tool includes a linkage mechanism pivotally connected to each end of the band and means pivotally connecting the linkage mechanism to the cutting tool.

14. In a method for terminating the thrust on an accidentally ignited solid propellant rocket motor of the type having a casing, retarding the expansion of the casing during pressure build-up within the casing caused by burning of the solid propellant within the casing, and utilizing forces created by the expansion of the casing to rupture the casing to thereby destroy the rocket motor.

15. In a method for terminating the thrust on an accidentally ignited solid propellant rocket motor of the type having a casing by utilizing a cutting tool, restricting the expansion of the casing during pressure build-up within the casing caused by burning of the solid propellant withing the casing, and utilizing the forces created by the constriction to operate the tool to rupture the casing to thereby destroy the rocket motor.

References Cited in the file of this patent
UNITED STATES PATENTS

| | | |
|---|---|---|
| 2,850,976 | Seifert | Sept. 9, 1958 |
| 2,918,941 | Whiting | Dec. 29, 1959 |
| 3,038,303 | Gose | June 12, 1962 |